(12) United States Patent
Marchlewski et al.

(10) Patent No.: US 9,221,499 B1
(45) Date of Patent: Dec. 29, 2015

(54) TAILGATE STRIKER SUPPORT BRACKET

(71) Applicant: FORD GLOBAL TECHNOLOGIES, LLC, Dearborn, MI (US)

(72) Inventors: Jack Marchlewski, Saline, MI (US); John Comiez, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/312,944

(22) Filed: Jun. 24, 2014

(51) Int. Cl.
*B62D 33/00* (2006.01)
*B62D 33/037* (2006.01)
*B62D 29/00* (2006.01)
*E05B 79/02* (2014.01)

(52) U.S. Cl.
CPC ............ *B62D 33/037* (2013.01); *B62D 29/008* (2013.01); *E05B 79/02* (2013.01)

(58) Field of Classification Search
CPC ..... B62D 33/037; B62D 29/008; E05B 79/02
See application file for complete search history.

(56) References Cited

U.S. PATENT DOCUMENTS

| | | | | |
|---|---|---|---|---|
| 3,454,299 A | * | 7/1969 | Hewitt | B62D 33/0273 296/50 |
| 3,592,504 A | * | 7/1971 | Sandor | B60J 5/103 16/231 |
| 4,358,150 A | | 11/1982 | Nash | |
| 5,707,095 A | * | 1/1998 | Pribak | B62D 33/0273 16/82 |
| 7,258,373 B2 | | 8/2007 | Plett et al. | |
| 8,328,248 B2 | | 12/2012 | Scherr | |
| 2007/0085381 A1 | * | 4/2007 | Delaney | B62D 25/04 296/193.08 |
| 2009/0160206 A1 | * | 6/2009 | Pleet | B62D 33/0273 296/50 |
| 2013/0234467 A1 | | 9/2013 | Brown, Jr. | |

OTHER PUBLICATIONS

F-150, 2010 Rear Box Diagram, Copyright 2008-2010, Ford Motor Company Limited http://www.fordparts.com/Commerce/CatalogResults.aspx?y=2012&m=Ford&mo=F-150#Search.

* cited by examiner

*Primary Examiner* — Lori L Lyjak
(74) *Attorney, Agent, or Firm* — Raymond Coppiellie; Brooks Kushman P.C.

(57) ABSTRACT

A tailgate striker support bracket assembly for a pickup truck box. The assembly having a bracket with a striker support section sandwiched between a striker and a floating striker nut. The bracket having a web extending from the striker support section to a flange. The flange being affixed to a D-pillar of the truck box. The D-pillar being disposed between a side panel of the truck box and an outer panel of the pickup. The D-pillar also being disposed longitudinally forward from the striker. The pickup truck box being made from mostly aluminum alloy components.

19 Claims, 2 Drawing Sheets

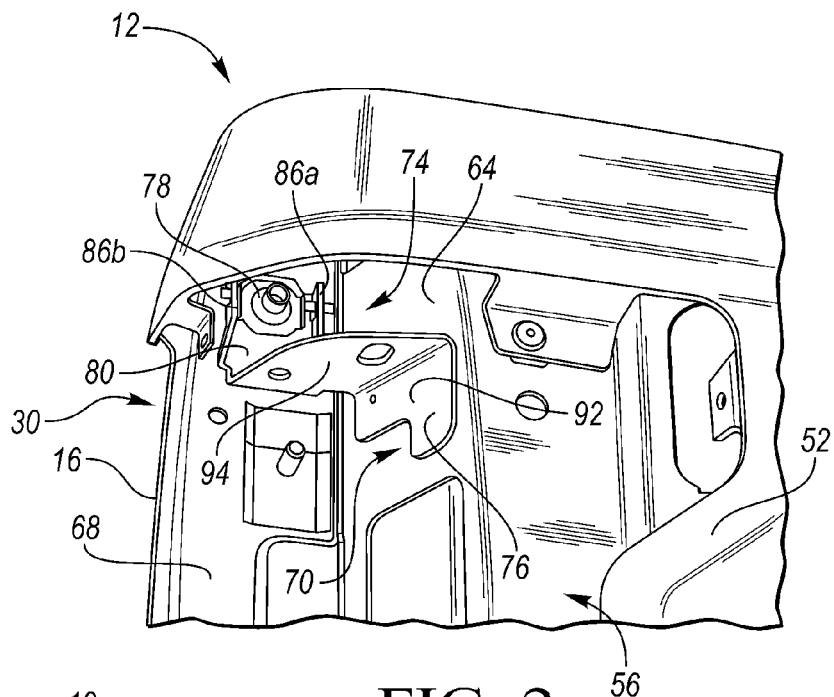
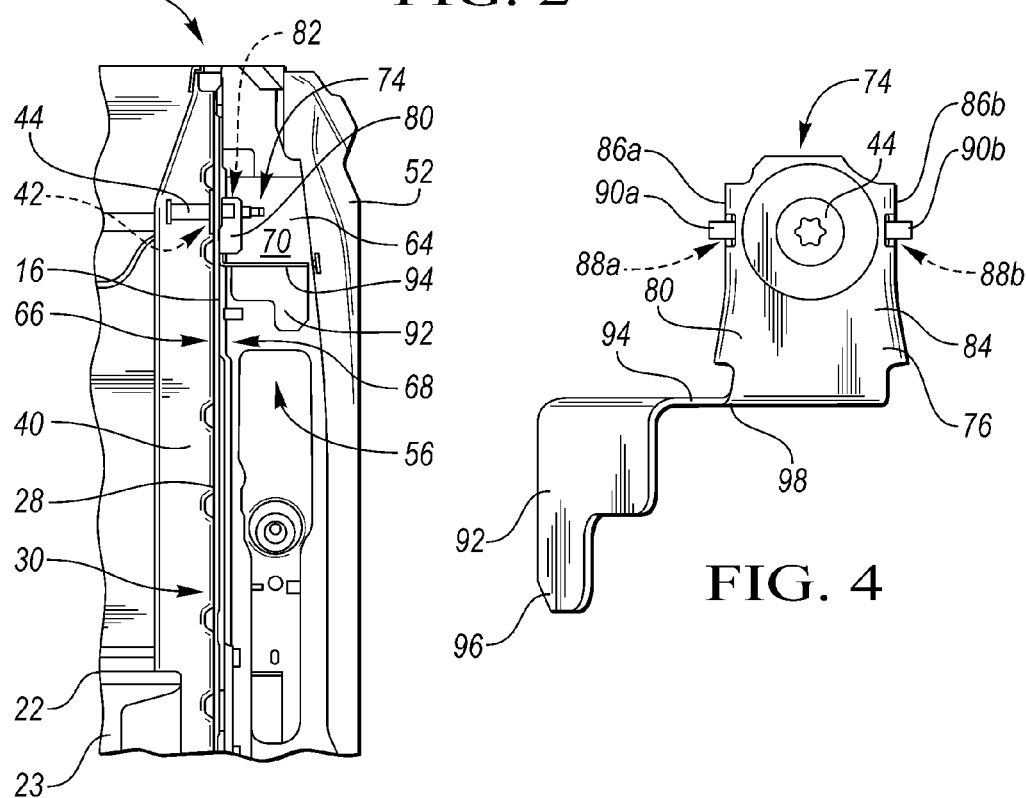
FIG. 2
FIG. 3
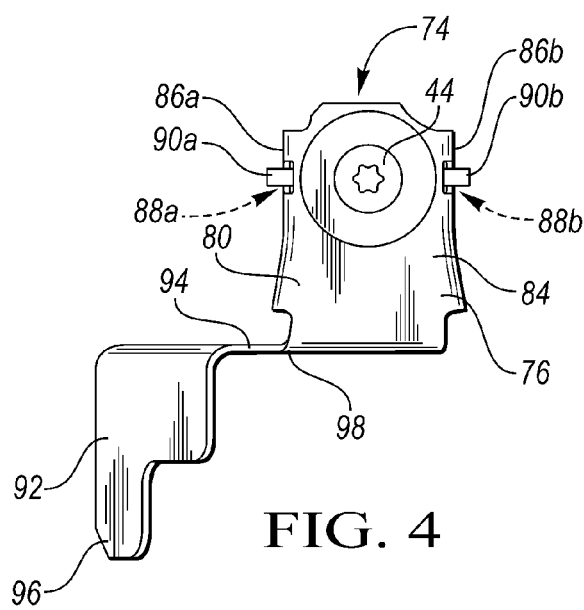
FIG. 4

TAILGATE STRIKER SUPPORT BRACKET

TECHNICAL FIELD

This disclosure relates to pickup truck tailgate strikers and specifically to tailgate strikers used on pickup trucks having at least a portion of a truck bed made from aluminum alloy.

BACKGROUND

Pickup trucks are motor vehicles with a front passenger area, often referred to as a cab, and an open top rear cargo area, often referred to as a box. The box typically has a substantially flat bed from which two sidewalls and a forward interconnecting headboard extend upwardly therefrom. Pickup trucks may also employ a bottom hinged door, commonly referred to as a tailgate, hinged at the rear edge of the bed and closable to provide a fourth wall for the cargo area. Cabs and boxes may be separate assemblies or part of the same unibody structure. Pickup trucks are popular largely because the box allows them to be utilized in so many different ways, including carrying a variety of types of cargo and towing various types of trailers.

Traditionally the majority of body structures on pickup trucks have been formed from steel alloys. Through years of experience, pickup truck designers have learned how to engineer steel truck body parts that withstand the variety of demanding pickup truck applications. The current regulatory and economic environments have increased the importance of making pickup trucks more fuel efficient as well as functional and durable. One way to reduce the fuel consumption of a vehicle is to reduce vehicle structure weight.

Aluminum alloys typically have a higher strength to weight ratio than steel alloys. Consequently, replacing steel with aluminum offers the potential for weight reduction. However, the elastic modulus of aluminum is generally lower than the elastic modulus of steel. As well, fabrication techniques and methods of joining parts that work well for steel parts may not work well for the same aluminum part. Due to these and other differences, simple material substitution does not necessarily produce an acceptable design.

Aluminum alloys are generally identified by a four-digit number, the first digit of which typically identifies the major alloying element. When describing a series of aluminum alloys based on the major alloying element, the first number may be followed by three x's (upper or lower case) or three 0's (zeros). For example, the major alloying element in 6xxx or 6000 series aluminium alloy is magnesium and silicon, while the major alloying element of 5xxx or 5000 series is magnesium and for 7xxx or 7000 series is zinc. Additional numbers represented by the letter 'x' or number '0' in the series designation define the exact aluminum alloy. For example, a 6061 aluminum alloy has a composition of 0.4-0.8% Silicon, 0-0.7% Iron, 0.15-0.4% Copper, 0-0.15% Manganese, 0.8-1.2% Magnesium, 0.04-0.35% Chromium, 0-0.25% Zinc, and 0-0.15% Titanium. Different alloys provide different trade-offs of strength, hardness, workability, and other properties.

In addition, five basic temper designations may be used for aluminum alloys which are: F—as fabricated, O—annealed, H—strain hardened, T—thermally treated, and W—as quenched (between solution heat treatment and artificial or natural aging). The temper designation may be followed by a single or double digit number for further delineation. For example, aluminum with a T6 temper designation has been solution heat treated and artificially aged, but not cold worked after the solution heat treatment (or such that cold working would not be recognizable in the material properties).

SUMMARY

One aspect of this disclosure is directed to a pickup truck tailgate striker support bracket assembly. In this aspect a striker is configured to receive a latch of a tailgate. The assembly has a striker nut configured to couple the striker to a truck box side panel. The assembly has a bracket having a striker support section configured to be sandwiched with the truck box side panel by the striker and striker nut, and the bracket has a flange extending from the striker support section to engage a truck box D-pillar.

The striker support section may have a first surface extending in substantially vertical and longitudinal directions when sandwiched with the truck box side panel. The flange may have a second surface extending in substantially vertical and transverse directions when engaging the box D-pillar. The bracket may also have a web section disposed between the striker support section and flange. The web section may have a third surface extending from the first surface to the second surface in substantially longitudinal and transverse directions.

In this assembly, the striker support section may have two opposing retainer tabs extending substantially transversely from the first surface. The retainer tabs may each define a retainer hole. The striker nut may have two opposing ears extending outwardly from each other and each may be disposed in a respective retainer hole.

In this aspect the truck box side panel may be an aluminum alloy. The truck box side panel may be 6xxx series aluminum. The bracket may also be an aluminum alloy. The bracket may be 5xxx series or 6xxx series aluminum.

Another aspect of this disclosure is directed to a truck box. The truck box has a bed disposed between two opposing side panels. Each side panel defines a striker hole located above the bed. Each side panel is supported by a D-pillar. In this aspect, a striker extends through one of the striker holes. A tailgate is pivotally connectable to the side panels proximate a rear edge of the bed. The tailgate has a latch selectively couplable to the striker. As well, this aspect has a bracket anchored to one D-pillar to support the striker.

The bracket may have a striker support section in contact with the side panel proximate one the striker holes. The bracket may have a flange affixed to the D-pillar. The bracket may also have a web section extending between the striker support section and the flange. The striker support section may extend in a substantially vertical and longitudinal direction. The web section may extend from the striker support section in substantially longitudinal and transverse directions. The flange may extend from the web section in substantially vertical and transverse directions.

Again the bracket may define a second striker hole. The striker may extend through the second striker hole. A striker nut may fixedly engaging the striker sandwiching the side panel and bracket. In this case, the bracket and striker nut may be configured to provide adjustability of the striker relative to the side panel.

In this aspect, the striker may extend from one of the side panels in a substantially transverse direction. The pivoting of the tailgate into a closed position may cause the latch to contact the striker imparting a longitudinal force against the striker. In this case, the bracket is then configured to transfer at least a portion of the longitudinal force into the D-pillar.

The truck box may have an outer panel connected to the side panel. The D-pillar may be disposed in between the side panel and outer panel. The side panel, outer panel, and D-pillar may cooperate to at least partially define a rear lamp opening. The bracket is disposed within the rear lamp opening. As well, the bed, side panels and D-pillars may be 6xxx series aluminum.

A further aspect of this disclosure is directed to a pickup truck. The pickup truck has a truck box defining a tailgate frame. The truck box also has a D-pillar proximate the tailgate frame. A bracket is connected to the D-pillar and extends to a backside of the tailgate frame. A striker is connected to the bracket and extends from a front side of the tailgate frame. In this aspect, the bracket is configured to transfer a portion of a force imparted from a tailgate latch on the striker to the D-pillar.

The pickup truck may have a tailgate, or tailgate assembly, in which the tailgate latch is a part of the tailgate. The tailgate may be pivotally connected to and disposed within the tailgate frame. The tailgate frame may be at least partially defined by opposing side panels. The opposing side panels may be bisected by a bed. The bed may extend substantially transversely between the side panels. The bed may also extend longitudinally forward from the tailgate frame. The side panels may extending substantially vertically to frame the tailgate. The side panels may also extend longitudinally forward from the tailgate frame. One of the opposing side panels may be connected to the D-pillar longitudinally forward from the tailgate frame. In this aspect, the D-pillar may have a force resistive surface extending substantially transversely and vertically. The force resistive surface may receive the portion of the force imparted from the tailgate latch. The force resistive surface may be orthogonal to a portion of the force imparted from the tailgate latch.

The pickup truck may also have a floating striker nut. The floating striker nut may be configured to connect the striker to the bracket sandwiching a portion of the bracket to the tailgate frame. The bracket may define retainer holes to capture the floating striker nut, while allowing for vertical and longitudinal movement of the floating striker nut to provide for striker adjustment. The bracket may be welded to the D-pillar. The bracket may be riveted to the D-pillar. In this aspect, the bed, opposing side panels, or D-pillars, or any combination, may be made from a 6xxx series aluminum.

The above aspects of this disclosure and other aspects will be explained in greater detail below with reference to the attached drawings.

BRIEF DESCRIPTION OF THE DRAWINGS

FIG. 2 is a partial perspective view of a striker support bracket connected to a box D-pillar.

FIG. 3 is a partial rear view of a striker and a striker support bracket with the outer panel of the box sidewall removed.

FIG. 4 is a side view of a striker and a striker support bracket with the box sidewall completely removed.

DETAILED DESCRIPTION

Figure 1:
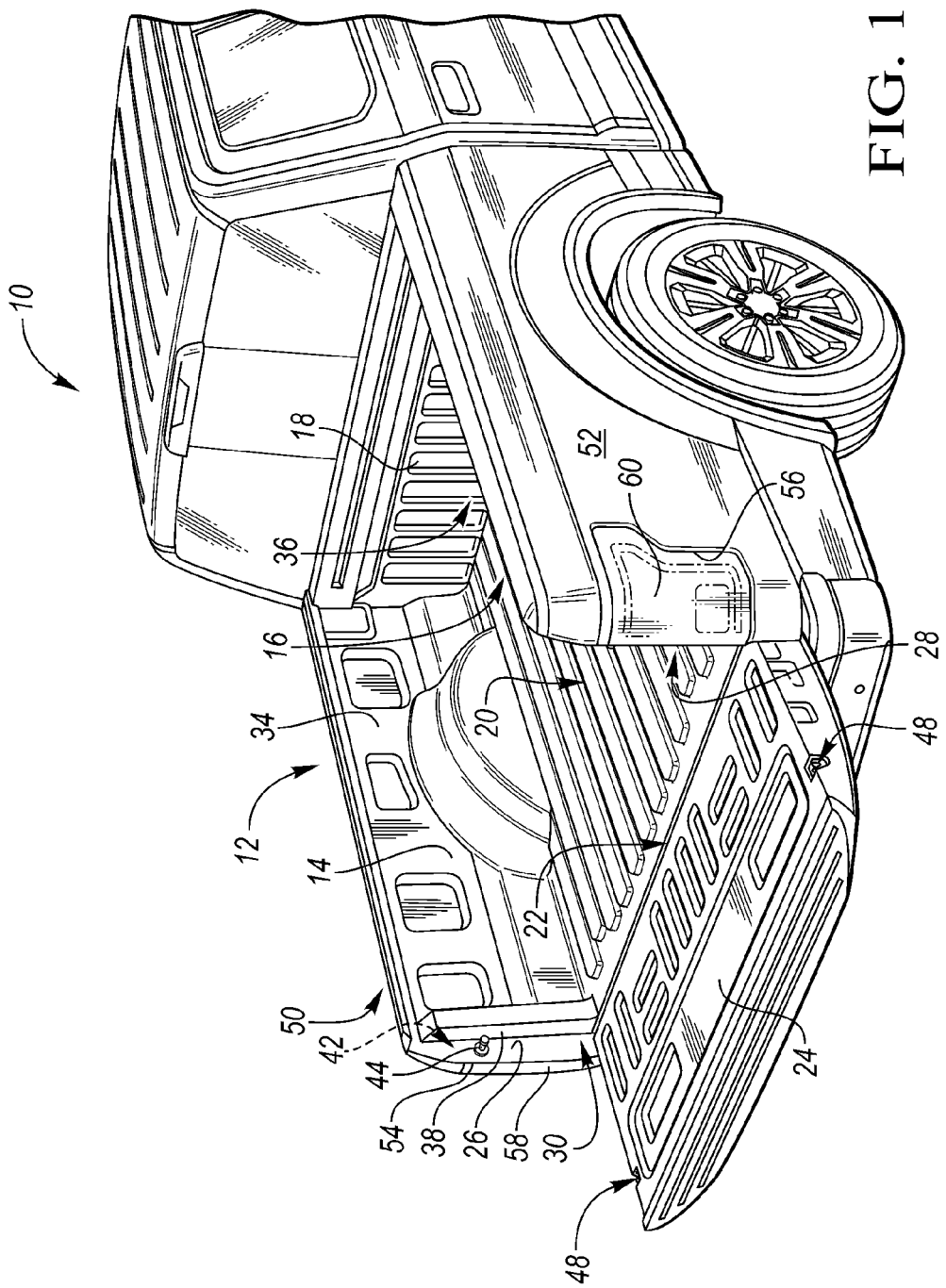
FIG. 1 is a perspective rear view of a pickup truck with an open tailgate.

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

FIG. 1 shows a pickup truck 10 having a truck box 12. The truck box 12 has a left side panel 14 opposing a right side panel 16, a headboard 18, and a bed 20. The opposing side panels 14, 16 extend substantially longitudinally forward from a back end of the pickup truck 10. Substantially longitudinally forward, as used here, means that the direction of extension is more in the longitudinal direction than in any other direction over the length of the component. The side panels 14, 16, however, may have bends and surface features that extend in other vehicle directions over the length of the components. The side panels 14, 16 may extend to the headboard 18. The headboard 18 may be connectably disposed between the side panels 14, 16. Each side panel 14, 16 may be a single body stamping or each panel may be an assembly of body components made from other manufacturing process connected together. Body components may be connected together by fastening techniques such as, but not limited to, rivets or welding.

The bed 20 is disposed between the side panels 14, 16. The bed 20 extends substantially transversely between the side panels 14, 16. Substantially transversely, as used here, means that the direction of extension is more in the transverse direction than in any other direction over the width of the component. The bed 20, however, may have bends and surface features that extend in other vehicle directions over the width of the component. The side panels 14, 16, the headboard 18, and the bed 20 cooperate to define the main cargo area of the box 12.

The side panels 14, 16 may continue to extend longitudinally rearward from a rear edge 22 of the bed 20. The side panels 14, 16 may extend vertically upwardly and downwardly from the rear edge 22 of the bed 20. The bed 20 may bifurcate the portions of the side panels 14, 16 that extend longitudinally rearward from the bed 20. The bed 20 may also have a sill 23 (see FIG. 3) that extends downwardly from the rear edge 22.

The pickup truck 10 may have a tailgate 24 that is pivotally connectable to the side panels 14, 16 proximate the rear edge 22 of the bed 20. Frame portions 26, 28 of the side panels 14, 16 may extend substantially vertically along sides of a closed tailgate 24 (tailgate 24 shown open) to frame the tailgate 24. The frame portions 26, 28 of the side panels 14, 16 may be the portions of the side panels 14, 16 that extend longitudinally rearward and vertically upwardly and downwardly from the rear edge 22 of the bed 20. The frame portions 26, 28 of the side panels 14, 16 may also be referred to as a tailgate frame 30. Said another way, the tailgate frame 30 may be at least partially defined by the opposing side panels 14, 16 and bisecting bed 20. The bed 20 main extend substantially longitudinally forward from the frame 30.

The side panels 14, 16 may have main box portions 34, 36 that extend substantially longitudinally forward from respective frame portions 26, 28. The side panels 14, 16 may have transverse portions 38, 40 disposed between the frame portions 26, 28 and the main box portions 34, 36 (see FIG. 3 for right-hand transverse portion 40). The transverse portions 38, 40 may extend upwardly from the rear edge 22 of the bed 20. The transverse portions 38, 40 and sill 23 (see FIG. 3) may also be considered part of the tailgate frame 30. The tailgate 24 may be said to be pivotally disposed within the tailgate frame 30.

The side panels 14, 16 may define at least one striker hole 42 with a striker 44 extending therethrough. The striker 44 may be located on the frame portion 26, 28 of the side panels 14, 16. The striker hole 42 and striker 44 may be located vertically above and offset longitudinally rearward from the bed 20. The truck box 12 may have two strikers 44 disposed transversely opposite from each other on the side panels 14, 16 and at substantially the same vertical height on the side panels 14, 16. The striker 44 may also be said to be disposed on the tailgate frame 30 of the box 12. The striker 44 may extend from the frame 30, and from the side panels 14, 16 in a substantially transverse direction.

The tailgate 24 may have at least one tailgate latch 48 selectively couplable to the striker 44. The tailgate 24 may be pivoted at the side panels 14, 16 proximate the rear edge 22 of the bed 20 to close off the cargo area of the truck box 12. The tailgate 24 in the close position may be opposite and substantially parallel to the headboard 18. The tailgate latch 48 may impart into the striker 44 a force when the tailgate 24 is closed. The tailgate latch 48 may impart a force substantially in a longitudinally forward direction. As well, when the tailgate 24 is closed and the tailgate latch 48 is coupled to the striker 44, cargo in the truck box 12 may impart a longitudinally rearward force on the tailgate 24 resulting in the tailgate latch 48 imparting a force substantially in a longitudinally rearward direction.

Left and right outer panels 50, 52 may also be connected to respective side panels 14, 16. Outer panels may partially define respective rear lamp openings 54, 56 with rear lamps 58, 60 disposed therein. The side panels 14, 16, headboard 18, bed 20, or outer panels 50, 52, or any combination of the above may be an aluminum alloy. The side panels 14, 16, headboard 18, bed 20, and outer panels 50, 52 may be 6xxx series aluminum. Thus it may be advantageous to support the striker 44 on the side panels 14, 16 such that a majority of the longitudinal forces are not transferred into the striker holes 42 or the side panels 14, 16.

FIGS. 2 and 3 are partial views of a right upper corner of the rear of the truck box 12. The right outer panel 52 and right side panel 16 partially define the right rear lamp opening 56. The right rear lamp 60 (see FIG. 1) is removed showing a D-pillar 64 disposed in the lamp opening 56 between the side panel 16 and outer panel 52. Both the side panel 16 and the outer panel 52 may be connected to the D-pillar 64. The side panel 16 may be supported by the D-pillar 64.

FIG. 3 also has the tailgate 24 (see FIG. 1) removed showing the rear edge 22 of the bed 20, the sill 23 extending downwardly therefrom, the transverse portion 40 extending upwardly therefrom, and the frame portion 28 of the side panel 16. The frame portion 28, transverse portion 40 and sill 23 may together, or singularly, define the tailgate frame 30. The frame 30 may have a front-side 66 facing the cargo area of the truck box 12 and a backside 68 opposite the front-side 66.

In both figures, the D-pillar 64 is disposed between the side panel 16 and outer panel 52 proximate the tailgate frame 30. The D-pillar 64 may be disposed longitudinally forward from the tailgate frame 30. The side panel 16 and the outer panel 52 may both be connected to the D-pillar 64 longitudinally forward from the tailgate frame 30. The D-pillar 64 may have a force resistive surface 70 extending substantially transversely and vertically in vehicle directions. The D-pillar 64 may also be an aluminum alloy. The D-pillar 64 may be a 6xxx series aluminum.

FIGS. 2, 3 and 4 showcase a pickup truck tailgate striker support bracket assembly 74. The key elements of the striker support bracket assembly 74 are a bracket 76, the striker 44, and a floating striker nut 78 configured to couple the striker 44 to a truck box side panel 16. The bracket 76 is shown in FIGS. 2 and 3 disposed within the rear lamp opening 56. The bracket 76 may be anchored to the D-pillar 64 to support the striker 44. The bracket 76 may be welded to the D-pillar 64. The bracket 76 may be connected to the D-pillar 64 and extend to the backside 68 of the tailgate frame 30.

The bracket 76 is configured such that a portion of the longitudinal force imparted into the striker 44 from the latch 48 by the pivoting of the tailgate 24 (see FIG. 1) into a closed position is transferred into the D-pillar 64. The bracket 76 may transfer a majority of the force imparted from the tailgate latch 48 on the striker 44 to the D-pillar 64 and thus not transferring the force into the side panel 16. The force resistive surface 70 may receive a portion of the force imparted from the tailgate latch 48 on the striker 44.

The bracket 76 may have a striker support section 80 configured to be sandwiched with the truck box side panel 16 by the striker 44 and striker nut 78. The striker support section 80 may be in contact with the side panel 16 proximate the striker hole 42. The striker support section 80 may also define a second striker hole 82. The striker 44 may extend through the striker hole 42 defined by the side panel 16 and the second striker hole 82 defined by the striker support section 80 of the bracket 76.

The striker support section 80 may have first surface 84 extending in substantially vertical and longitudinal directions when sandwiched with the truck box side panel 16. The striker support section 80 may also have two opposing retainer tabs 86a, 86b extending substantially transversely from the first surface 84. The two opposing retainer tabs 86a, 86b may each define a retainer hole 88a, 88b. The floating striker nut 78 may have two opposing ears 90a, 90b extending outwardly from each other. Each of the ears 90a, 90b may be disposed in one of the retainer holes 88a, 88b of the striker support section 80 of the bracket 76. The ears 90a, 90b and retainer holes 88a, 88b cooperate to receive the floating striker nut 78 and provide for striker 44 adjustment relative to the frame 30. The ears 90a, 90b and retainer holes 88a, 88b cooperate to provide vertical adjustment of the striker 44.

The striker nut 78 may define an internal thread that couples with an external thread of the striker 44. Threading of the striker 44 into the striker nut 78 connects the striker 44 to the bracket 76 sandwiching a portion of the bracket 76 to the tailgate frame 30. The striker nut 78 fixedly engages the striker 44 sandwiching the side panel 16 and bracket 76.

The bracket 76 may also has a flange 92 and a web 94 extending between the striker support section 80 and flange 92. The flange 92 may be the portion of the bracket 76 affixed to the truck box D-pillar 64. The flange 92 may have a second surface 96 extending in substantially vertical and transverse directions when engaging the box D-pillar 64. The web section 94 extending between the striker support section 80 and flange 92 may have a third surface 98 extending from the first surface 84 to the second surface 96 in substantially longitudinal and transverse directions.

Any forces imparted into the striker 44 may be transferred from the striker 44 to the striker nut 78 and into the striker support section 80 of the bracket 76. The bracket then transfers the forces from the striker support section to the flange 92 via the web 94 extending therebetween. The flange 92 is affixed to the force resistive surface 70 of the D-pillar 64. The force resistive surface 70, and thus the flange 92 are substantially orthogonal in direction to the forces imparted on the striker 44 by the tailgate latch 48. This configuration allows for a greater support of the striker 44 and lowers forces from being transferred from the striker 44 into the inner panels 14, 16. The bracket 76 may be an aluminum alloy. The bracket 76 may be 5xxx series aluminum.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A tailgate striker assembly for a pickup truck, the assembly comprising:
   a striker engageable with a tailgate latch;
   a striker nut configured to couple the striker to a truck box side panel; and
   a bracket having a striker support section configured to be sandwiched with the truck box side panel by the striker and striker nut, wherein the bracket has a flange extending from the striker support section and engageable with a truck box D-pillar, and a web section extending between the striker support section and the flange.

2. The assembly of claim 1 wherein the striker support section has a first surface extending in substantially vertical and longitudinal directions when sandwiched with the truck box side panel.

3. The assembly of claim 2 wherein the flange has a second surface extending in substantially vertical and transverse directions when engaging the truck box D-pillar.

4. The assembly of claim 3 wherein the web section has a third surface extending from the first surface to the second surface in substantially longitudinal and transverse directions.

5. The assembly of claim 1 wherein the truck box side panel is aluminum alloy.

6. The assembly of claim 1 wherein the bracket is aluminum alloy.

7. A truck box comprising:
   two opposing side panels each defining a striker hole and supported by a D-pillar;
   a striker extending through one striker hole;
   a tailgate having a latch couplable to the striker; and
   a bracket supporting the striker and including a striker support section in contact with the side panel proximate one striker hole, a flange affixed to the D-pillar, and a web section extending between the striker support section and the flange.

8. The truck box of claim 7 wherein the striker support section extends in substantially vertical and longitudinal directions, the web section extends from the striker support section in substantially longitudinal and transverse directions, and the flange extends from the web section in substantially vertical and transverse directions.

9. The truck box of claim 7 wherein the bracket defines a second striker hole and the striker extends through the second striker hole.

10. The truck box of claim 7 further comprising a striker nut fixedly engaging the striker sandwiching the side panel and bracket, and the bracket and striker nut configured to provide adjustability of the striker relative to the side panel.

11. The truck box of claim 7 wherein the striker extends from one of the side panels in a substantially transverse direction, wherein pivoting of the tailgate into a closed position causes the latch to contact the striker imparting a longitudinal force against the striker, and wherein the bracket transfers at least a portion of the longitudinal force into the D-pillar.

12. The truck box of claim 7 further comprising an outer panel connected to the side panel with the D-pillar disposed therebetween, the side panel, outer panel, and D-pillar cooperating to define a rear lamp opening, and wherein the bracket is disposed within the rear lamp opening.

13. The truck box of claim 7 wherein the side panels and D-pillars are 6xxx series aluminum.

14. A pickup truck comprising:
   a truck box defining a tailgate frame;
   a D-pillar proximate the tailgate frame and supporting an inner panel of the truck box;
   an outer panel connected to the inner panel with the D-pillar disposed therebetween, the inner panel, outer panel, and D-pillar cooperating to define a rear lamp opening;
   a bracket connected to the D-pillar such that the bracket is disposed within the rear lamp opening, and extending to a backside of the tailgate frame; and
   a striker connected to the bracket and extending from a front-side of the tailgate frame, wherein the bracket is configured to transfer a portion of a force imparted from a tailgate latch on the striker to the D-pillar.

15. The pickup truck of claim 14 further comprising a tailgate having the tailgate latch, the tailgate pivotally disposed within the tailgate frame, wherein the tailgate frame is at least partially defined by opposing inner panels bisected by a bed, the bed extending substantially transversely between the inner panels and longitudinally forward from the tailgate frame, the inner panels extending substantially vertically to frame the tailgate and the inner panels extending longitudinally forward from the tailgate frame, and the D-pillar being connected to one of the opposing inner panels longitudinally forward from the tailgate frame, wherein the D-pillar has a force resistive surface extending substantially transversely and vertically to receive the portion of the force imparted from the tailgate latch.

16. The pickup truck of claim 14 wherein the inner panel is 6xxx series aluminum.

17. The pickup truck of claim 14 further comprising a floating striker nut configured to connect the striker to the bracket sandwiching a portion of the bracket to the tailgate frame, and the bracket defines retainer holes to receive the floating striker nut and provide for striker adjustment.

18. The pickup truck of claim 14 wherein bracket further includes a support section in contact with the inner panel proximate the striker a flange affixed to the D-pillar and a web section extending between the support section and the flange.

19. A truck box comprising:
   a D-pillar;
   a bracket including a flange connected to the D-pillar, and a striker support section having a first surface engaging an inner panel of the box and two opposing retainer tabs each extending transversely from the first surface and defining a hole;
   a striker engageable with a tailgate latch; and
   a fastener coupling the striker to the panel and including two opposing ears each disposed in one of the holes.

* * * * *